F. R. HUME.
YIELDING UNIVERSAL JOINT.
APPLICATION FILED JUNE 21, 1920
1,386,000.
Patented Aug. 2, 1921.
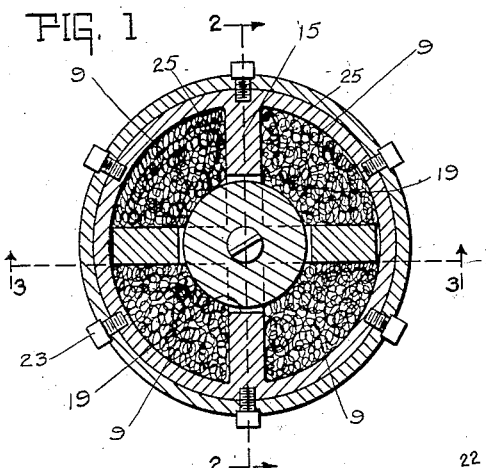
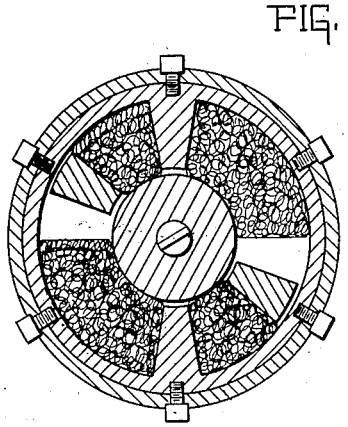
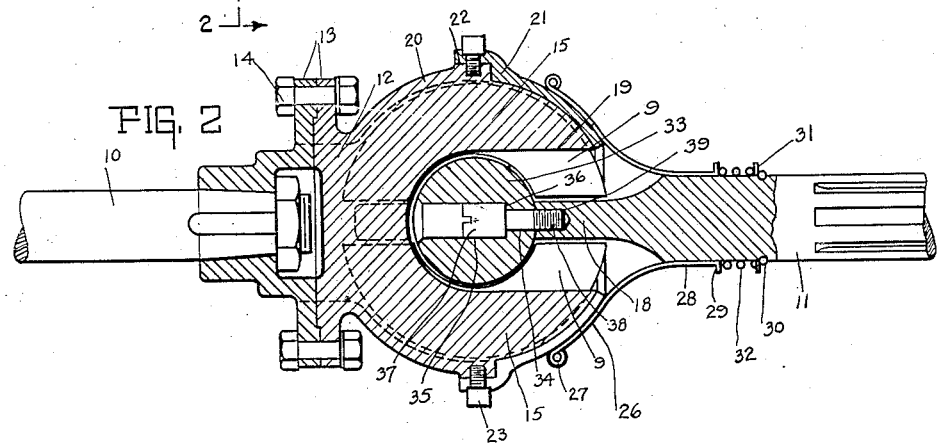
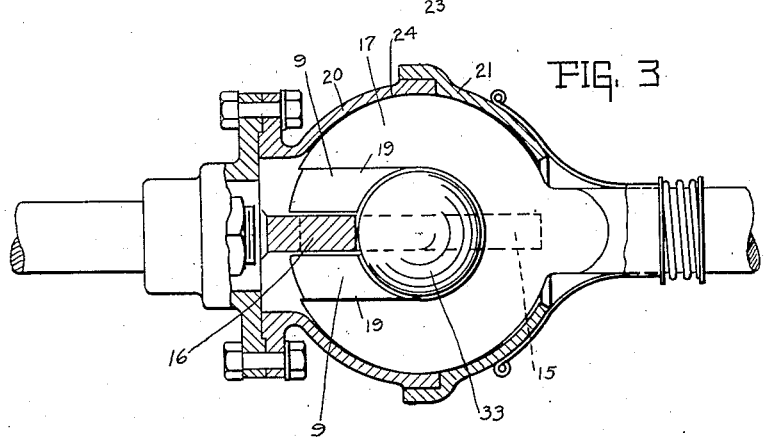
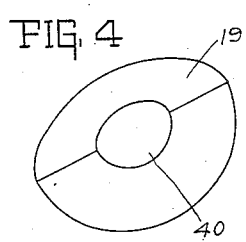
FRANK R. HUME,
INVENTOR.
BY
Lockwood Lockwood
ATTORNEYS.

UNITED STATES PATENT OFFICE.

FRANK R. HUME, OF INDIANAPOLIS, INDIANA.

YIELDING UNIVERSAL JOINT.

1,386,000.  Specification of Letters Patent.  Patented Aug. 2, 1921.

Application filed June 21, 1920.- Serial No. 390,608.

*To all whom it may concern:*

Be it known that I, FRANK R. HUME, a citizen of the United States, and a resident of Indianapolis, county of Marion, and State of Indiana, have invented a certain new and useful Yielding Universal Joint; and I do hereby declare that the following is a full, clear, and exact description thereof, reference being had to the accompanying drawings, in which like numerals refer to like parts.

This invention relates to resilient couplings for angularly positioned shafts and the like wherein the universal coupling or shaft is provided with cushioning means between the driving and the driven parts for transmitting motion from one to the other of the universal coupling or shafts.

The chief object of the invention is to provide rubber-like cushioning means between the driving and driven parts of the universal joint which transmits power from the driving part to the driven part in an improved manner.

One feature of the invention is that the resilient or rubber-like cushioning means provided is of spherical wedge shape so that the same transmits power from the driving to the driven parts with increased efficiency.

Another feature of the invention consists of the centering means, about the center of which the members of the universal joint are movable angularly to each other.

Another feature of the invention consists in inclosing within suitable housing means the driving and driven parts, as well as the cushioning means interposed therebetween, said housing means preferably being formed upon the coupling to coöperate with the centering means as well as retain the cushioning means in operative position.

A further feature of the invention consists in providing a closure member for said housing means to protect the rubber cushioning means from oil and the like when said cushioning means is formed from rubber or other material subject to destructive action by oil and the like.

A still further feature of the invention consists in positioning the sectored or spherical wedge cushioning means within the joint housing so that said cushioning means. when associated with the transmission system of a motor vehicle, will absorb or provide longitudinal movement of the splined member of the universal joint.

The full nature of this invention will be understood from the accompanying drawings and the following description and claims.

In the drawings Figure 1 is a central sectional view of the invention. Fig. 2 is a central longitudinal view taken on the line 2—2 of Fig. 1. Fig. 3 is a similar view taken on the line 3—3 of Fig. 1. Fig. 4 is a perspective view of the sectored or spherical wedge cushioning means. Fig. 5 is a view similar to Fig. 1 and of a modified form of the invention.

In the drawings 10 indicates what may be termed the driving shaft and 11 the driven shaft of a power transmitting mechanism, said shafts being adapted to be angularly positioned with respect to each other and said last mentioned shaft adapted to be rotated by said first mentioned shaft in any one of the adjusted angular positions.

The means interposed between said angularly positioned rotating shafts is a universal joint and coupling which is old in the art, but which in the present instance is constructed in an improved manner. When constructed to embody the features of the invention, the universal coupling or joint provides a resilient driving connection between said shafts and is also adapted to act as a thrust bearing if necessary. The driving shaft 10 is secured to a driving member 12 by means of the companion flanges 13 secured to each of said means and secured together by suitable bolt means 14, whereby said driving member 12 rotates with said shaft. In the present instance the driving member is shown provided with a pair of driving lugs or members 15 which extend radially from the longitudinal axis of the driving shaft 10 and member 12. In the present instance the radial driving members 15 are connected together at the base of the driving member 12 by the portion 16, see Fig. 3, such that said driving members and connecting members comprise a driving fork, the tines of which are the radial driving members 15.

Similarly the driven shaft, 11 is provided with a pair of radially extending driven lugs 17 connected by the intermediate portion 18, see Fig. 2, said driven lugs being similarly formed. Said driving fork constructions are adapted to be positioned such that the tines of one fork will lie in a plane which intersects the plane containing the tines of the other fork, see Figs. 1 and 5. Each of the fork constructions is provided with a slot which extends from the outer edge of the fork to the center of the universal joint such that said tines of both forks may be positioned in the intersecting position. The edges of said slot are indicated in the drawings by the numeral 19. Between said radially positioned driving and driven lug members 15 and 17 respectively, is positioned sectored cushioning means which, in the present instance, comprises a spherial wedge of rubber-like material.

As shown in Fig. 1, the present embodiment of the invention illustrates the two driving and two driven members spaced apart by four equal spherical wedges 9, each wedge being provided with a dihedral angle of substantially 90 degrees. It will be understood, however, that said spherical wedges may be provided with greater or smaller dihedral angles such that the driving and driven members may not be spaced symmetrically with each other, see Fig. 5, and it will also be understood that said spherical wedges may have dihedral angles of less angular measurement than the dihedral angle between two adjacent driving and driven radial members, see the same figure. In the preferred form of the invention, however, the four spherical wedges are substantially equal and substantially occupy the space between the adjacent driving and driven radial members such that the dihedral angle between said members is substantially equal to about the dihedral angle of the spherical wedges.

The means for retaining said spherical wedges in operative association with the radial driving and driven members comprise suitable housing means which, in the present instance, is shown secured to but one of the shafts and in this instance is shown secured to the driving shaft 10. In the present instance the spherical housing comprises two semi-spherical shells 20 and 21 provided with suitable complementary flange means 22 by which the same are secured together to form a spherical inclosing shell or housing by means of the bolt members 23, said bolt members, as shown clearly in Fig. 1, being positioned about said housing in spaced relation. The housing is shown divided so that the radial driven members 17 may be inserted into said housing and locked therein. As shown clearly in Figs. 2 and 3 the hemispherical shell portion 20 and the driving radial lug 15 is preferably formed integral.

As shown clearly in Fig. 3 the radial driving members 17 are provided with an arcuate outer edge 24 which is substantially circular and the center of which corresponds with the center of the universal joint so that said radial members may occupy said spherical housing and yet be free to move therein about the coupling center in the rotational movement of the universal joint. If desired the flat faces 25 of each radial driving member instead of being parallel to each other may be radially positioned with respect to the vertical axis, as shown clearly in Fig. 5.

The means associated with the housing and the other shaft for closing the universal joint to protect the rubber-like spherical wedge cushion from oil and the like which destroys the same, comprises a closure member 26, one end of which is flared outwardly and spherically to form a bowl portion adapted to be seatable upon the exterior of the spherical housing 20 and 21. Said bowl portion 26 is provided at the flared end with an annular bead portion 27 whereby said bowl may have unrestricted rotational movement upon the bowl portion 21 about the center of the coupling in the rotation of said joint. The other end of the closure member 26 is provided with a sleeve portion 28 which terminates in an outwardly extending circular flange portion 29, said sleeve portion being slidable upon the shaft 11. The shaft 11 is provided with a locking ring 30 against which a washer member 31 is positioned and between it and the circular flange 29 is positioned a tension spring member 32, whereby pressure is exerted upon the flange 29 to maintain the closure member 26 in engagement with the vertical housing 20 and 21.

Additional means for centering the shaft 11 with respect to the center of the universal joint comprise a ball member 33 positioned concentric with respect to the joint center. The ball member 33 is herein shown secured to the shaft other than the housing supporting shaft, such that the spherical housing and said ball will coöperate with each other. The ball 33 is provided with a diametrical slot 34, said slot being enlarged at 35 to provide a seat 36 adapted to seat the head 37 of a bolt member, the threaded end 38 of which is seatable in the axially positioned and threaded opening 39 formed in the connecting member 18. Since the ball member 33 is preferably formed separate from the driven fork construction, the edges 19 of the slot hereinbefore described are spaced apart sufficiently to receive said ball 33 and permit the same to be secured to the connecting portion 18, as shown, such that the center of said ball coincides with the center of the joint. Similarly the edges 19 of the slots between the adjacent driving fork construction is spaced apart to receive said ball construction when the same is inserted in assembled relation, said spaced slot construction being shown clearly in Fig. 2 for the driving fork and in Fig. 3 for the driven fork. In order to be positioned within the housing with the construction herein shown the sectored or spherical wedge cushioning means is provided with a central spherical slot or recess 40.

Other means than that disclosed may be associated with the driving and driven members to maintain all of said parts with respect to the shaft center and to inclose the same, said means preferably being the same means. Said simultaneous centering and inclosing means may, if desired, be supported by both of said shafts or by either of the same. The cushioning means as described and shown in Figs. 2 and 3 is adapted to act as a thrust bearing when the shaft 11 is moved longitudinally along its axis since the ball member 33 will then engage on the surface of the spherical slot 40 and transmit the thrust to the spherical housing portion maintaining said spherical wedges in operative relation with the driving and driven members. The longitudinal movement of the shaft 11 upon its axis is due to the splined construction commonly obtained in automobile transmission mechanisms, and there is sufficient resiliency in the universal coupling, as constructed, to absorb any thrust associated in said automobile construction.

It will be understood that while the shaft 11 may be positioned in any one of the innumerable number of positions with respect to the shaft 10, said positioning is limited by a critical spherical sector, the angle of which is determined by the relation of the several parts to each other, and in the present construction by the engagement of one of the edges 19 with the intermediate connecting portion of the other radial members. The greatest movement therefore for any given width of slot between the adjacent faces 19 is obtained when the driving and driven radial members are positioned symmetrically with respect to each other when the housing and said symmetrical wedges are provided with dihedral angles of substantially 90 degrees.

With the present construction the force from one shaft is transmitted to the other shaft by means of the spherical wedges through what may be termed concentric spheres, such that the lines of force from the radial driving members to the sectored or spherical wedge cushioning means is transmitted tangentially through the concentric spheres until it is transmitted by said spherical wedges to the adjacent driven radial member. In this manner rotational movement is transmitted from one shaft to the other shaft in an improved and more efficient manner than heretofore known.

While the invention has been described in detail, it will be apparent to those skilled in the art that many modifications of the same are possible, one of which has been illustrated and described herein, and some of which have been suggested in the foregoing specifications, but it will be understood that all of these and other modifications are considered to be within the broad purview of this invention.

The invention claimed is:

1. A universal coupling including a pair of shafts, a radial driving lug on one shaft and a radial driven lug on the other shaft, inclosing casing means, and a sectored spherical cushion within said casing and interposed between said radial lugs to transfer rotary movement from one shaft to the other.

2. A universal coupling, including a pair of shafts, a plurality of radial driving and driven members upon said shafts, a plurality of sectored spherical cushions interposed between said radial members to transfer rotational movement from one shaft to the other, and a pair of relatively movable concentric spherical means, each of said last mentioned means being secured to one of said shafts and coöperating with each other to secure and position said sectored spherical cushions in operative relation to said radial members.

3. A universal coupling, including a pair of shafts, a plurality of radial driving and driven members upon said shafts, a plurality of sectored spherical cushions interposed between said radial members to transfer rotational movement from one shaft to the other, inclosing spherical casing means, and ball means positioned within said casing means and at the center thereof, each of said sectored cushions having a recess to receive said ball means.

In witness whereof I have hereunto affixed my signature.

FRANK R. HUME.